Oct. 11, 1932.   D. CELENZA   1,882,354
COMBINATION SQUARE AND RULER
Filed Sept. 7, 1929
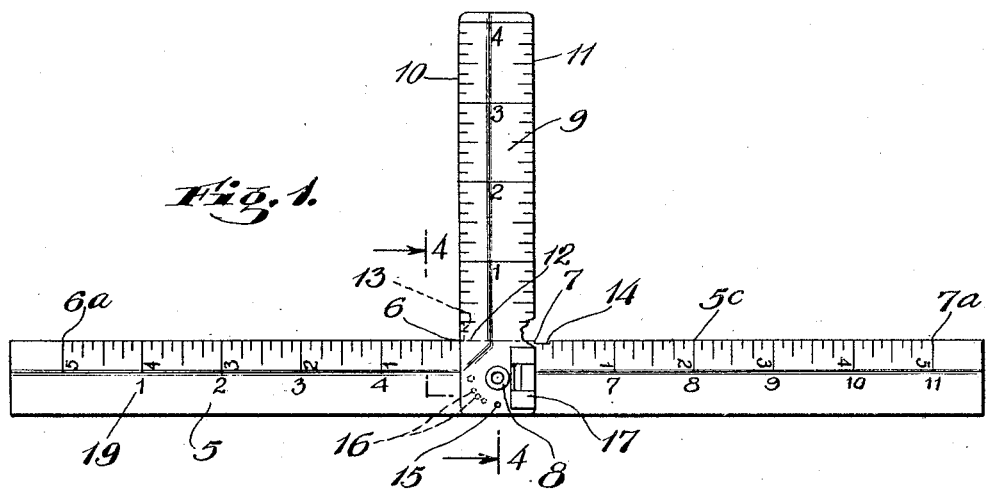
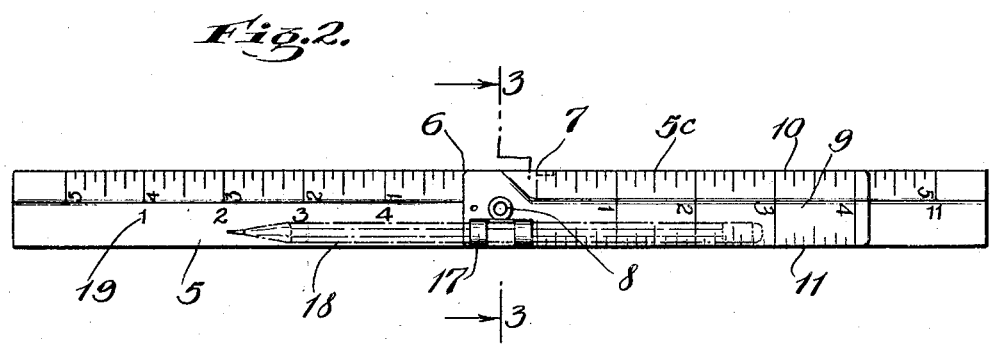
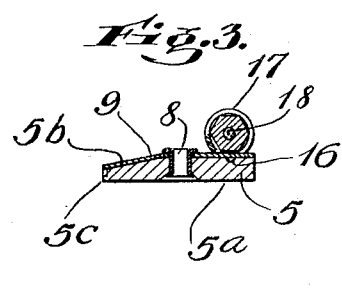
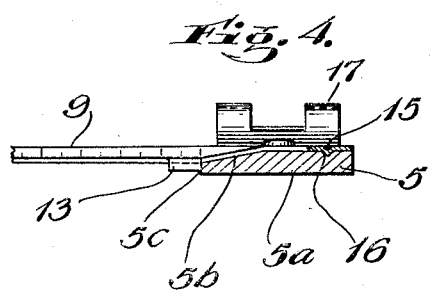
INVENTOR.
DOMENICO CELENZA
BY
ATTORNEY Patented Oct. 11, 1932

1,882,354

UNITED STATES PATENT OFFICE

DOMENICO CELENZA, OF BROOKLYN, NEW YORK

COMBINATION SQUARE AND RULER

Application filed September 7, 1929. Serial No. 390,894.

This invention relates to measuring and lay out tools such for example as rulers, squares and the like; and the object of the invention is to provide in combination with a ruler body of more or less conventional form but of modified design, a member pivotally supported centrally of the ruler and adapted to be extended angularly with reference to one side edge of the ruler to form a square or to provide several angles for lay out purposes within an arc of one hundred and eighty degrees; a further object being to provide means for retaining the movable member in its several positions of adjustment and especially with respect to predetermined angular positions thereof; a further object being to provide a pivot member of the class specified which is composed of relatively thin material so as not to add bulk to the ruler or to interfere with its conventional use; a further object being to provide in combination with the movable member, a spring clip for retaining a pencil in connection therewith; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan view of my improved tool showing the parts in extended position.

Fig. 2 is a view similar to Fig. 1 with the parts collapsed.

Fig. 3 is a section on the line 3—3 of Fig. 2; and,

Fig. 4 is a section on the line 4—4 of Fig. 1.

In the drawing, I have shown at 5 the ruler part of the tool which is of more or less conventional form comprising an elongated body having a flat lower side 5a and the upper surface of which is beveled at one side as shown at 5b to form a relatively thin scale edge 5c. Instead of providing the usual arrangement of the scale thereon, I mark from the points 6 and 7 centrally of the edge 5c, the inches and fractions of an inch from zero to five inches in the direction of the opposite ends of the rule as indicated at 6a and 7a.

Pivotally supported centrally of the ruler and centrally with respect to the points 6—7 as seen at 8 is a relatively thin square forming member 9, the side edges 10 and 11 of which are adapted to cross or come in line with the points 6 and 7 when the member 9 is extended at right angles to the ruler 5 as seen in Fig. 1 of the drawing. The member 9 may be composed of thin sheet metal, celluloid or other similar material and is preferably of such cross sectional form as to lie flat upon the upper surface of the ruler 5 as clearly seen in Figs. 3 and 4 of the drawing. The side edge of the member 9 is composed to lie upon the beveled face 5b of the ruler.

The member 9 is also preferably provided with a scale of any desired length which extends from the line 12 which is in alinement with the edge 5c of the rule when the member is in the position shown in Fig. 1 outwardly to the end of said member to the extent of four inches in the construction shown, but this member may be made of greater length if desired, and this is also true of the ruler 5.

I also preferably provide the member 9 adjacent the line 12 and on the edge 10 with an outwardly projecting stop 13 which is adapted to engage the edge 5c of the ruler to form a perfect square, and this stop rests in a recess 14 in the edge 5c of the ruler when the member 9 is in the position shown in Fig. 2. To support the member 9 in the position shown in Fig. 1 as well as in other angular positions such as 60 degrees—120 degrees;

45 degrees—135 degrees; and 30 degrees—150 degrees, I provide a downwardly projecting bead 15 at the pivot end of the member 9 which is adapted to enter anyone of a series of recesses 16 on the upper face of the ruler 5, which are arranged in such relation with reference to the pivot 8 as to provide the angles above referred to. It will be apparent, however, that the member 9 may be moved into any desired angular position for the purpose of making lay outs of any kind or class, and the member 9 may be used in conjunction with the edge 5c of the ruler at either side thereof.

I also preferably form integrally with the member 9 at the pivot end thereof and on the side edge 11, a spring clip 17 in which a pencil 18 may be supported as indicated in dot and dash lines in Fig. 2 of the drawing, and in full cross sectional lines in Fig. 3 of the drawing. It will be apparent that the arrangement of the clip is such as to support the pencil longitudinally within the side edge boundaries of the ruler as clearly seen, and this is also true of the member 9, the side edges 10 and 11 of which are preferably in alinement with the side edges of the ruler. In this connection, it will be apparent that if the width of the member 9 is equal to one inch of the standard scale, then the distance between the points 6 and 7 will represent one inch and can be used in making layouts or measurements by the scale marks indicated at 19 in Figs. 1 and 2 of the drawing.

It will be understood that while I have shown certain details of construction for carrying my invention into effect, that I am not necessarily limited to these details and various changes therein and modifications thereof may be made within the scope of the appended claims without departing from the spirit of my invention or sacrificing its advantages.

Having fully described my invention, what I claim as new and desire to secure by Letters Patent, is:

1. The combination with a ruler having a beveled side edge upon which scale markings are arranged, of a member, one end of which is pivoted centrally of said ruler to permit its movement from a position lying within the limits of the longitudinal edges of the ruler into angular positions with reference thereto, said member comprising a relatively thin strip, one side edge of which is angularly disposed to lie snugly upon the beveled edge of the ruler when said member is arranged in alinement therewith.

2. The combination with a ruler having a beveled side edge upon which scale markings are arranged, of a member, one end of which is pivoted centrally of said ruler to permit its movement from a position lying within the limits of the longitudinal edges of the ruler into angular positions with reference thereto, said member comprising a relatively thin strip, one side edge of which is angularly disposed to lie snugly upon the beveled edge of the ruler when said member is arranged in alinement therewith, and the pivoted end portion of said member being fashioned to form integral spring loops arranged upon the upper surface of said member.

3. The combination with a ruler having a beveled side edge upon which scale markings are arranged, of a member, one end of which is pivoted centrally of said ruler to permit its movement from a position lying within the limits of the longitudinal edges of the ruler into angular positions with reference thereto, said member comprising a relatively thin strip, one side edge of which is angularly disposed to lie snugly upon the beveled edge of the ruler when said member is arranged in alinement therewith, means for supporting said member in different positions of adjustment on said ruler, and a stop on one side edge of said member adapted to cooperate with the beveled edge of the ruler to gage the positioning of said member at right angles with respect to said ruler.

4. A tool of the class described comprising a ruler, one side edge of which is beveled, said ruler having a central blank portion and scale markings extending laterally from said blank portion from zero to a predetermined number of inches at each end portion of the ruler on the beveled edges thereof, a member one end of which is pivotally supported in connection with the central blank portion of the ruler and of a width equal to said blank portion and having scale markings reading from zero at the scale edges of the ruler outwardly to the free end of said member, when said member is disposed at right angles to said ruler, and one side of said member being offset to lie upon the beveled surface of the ruler when arranged longitudinally thereof.

5. A tool of the class described comprising a ruler, one side edge of which is beveled, and said ruler having a central blank portion and scale markings extending laterally from said blank portion from zero to a predetermined number of inches at each end portion of the ruler on the beveled edges thereof, a member one end of which is pivotally supported in connection with the central blank portion of the ruler and of a width equal to said blank portion and having scale markings reading from zero at the scale edges of the ruler outwardly to the free end of said member when said member is disposed at right angles to said ruler, one side of said member being offset to lie upon the beveled surface of the ruler when arranged longitudinally thereof, the breadth of said member corresponding to the breadth of the ruler, means on said member cooperating with one edge of the ruler for accurately positioning said member in right angle position with respect to said ruler, other means for frictionally retaining said member in different positions of adjustment, and the pivoted end of said member including integral spring loops arranged upon the upper surface thereof and in which a pencil is adapted to be supported to position said pencil within the side edge boundaries of the ruler when said member is in alinement therewith.

In testimony that I claim the foregoing as my invention I have signed my name this 3rd day of September, 1929.

DOMENICO CELENZA.